May 19, 1953  C. SUNDSTROM ET AL  2,639,418
PHOTOSENSITIVE DETECTION APPARATUS
Filed Dec. 9, 1950  3 Sheets-Sheet 1
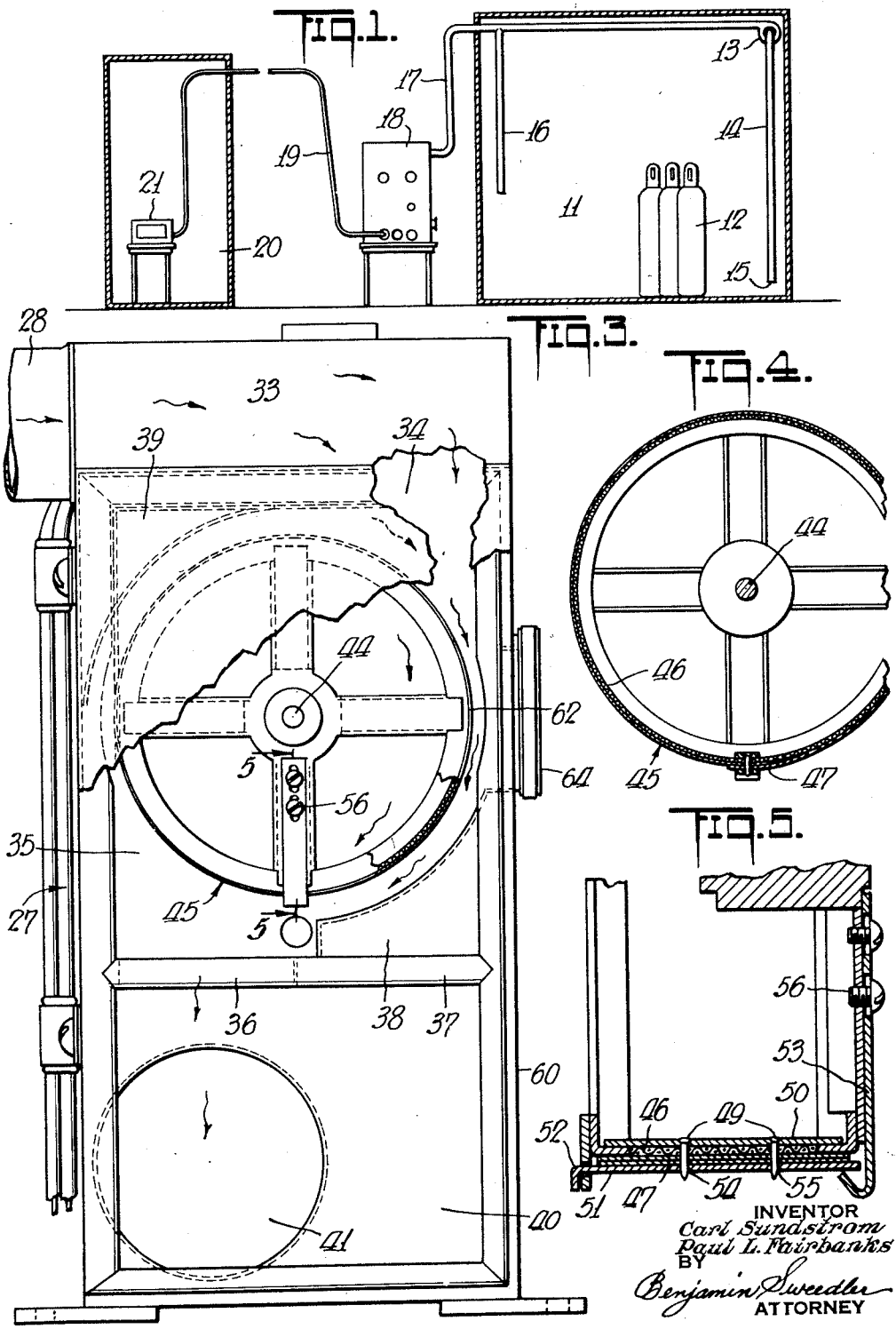
INVENTOR
Carl Sundstrom
Paul L. Fairbanks
BY
Benjamin Sweedler
ATTORNEY

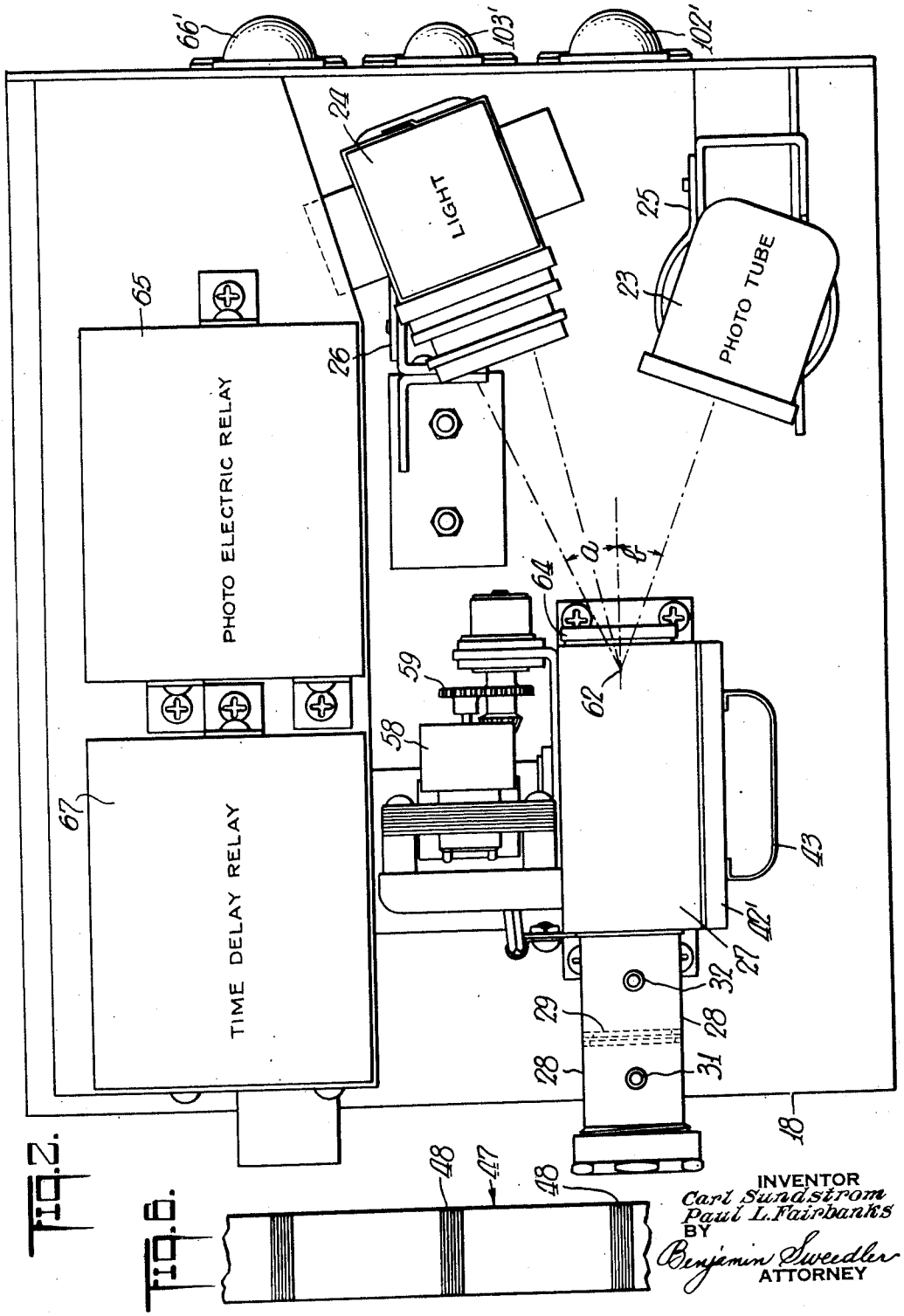

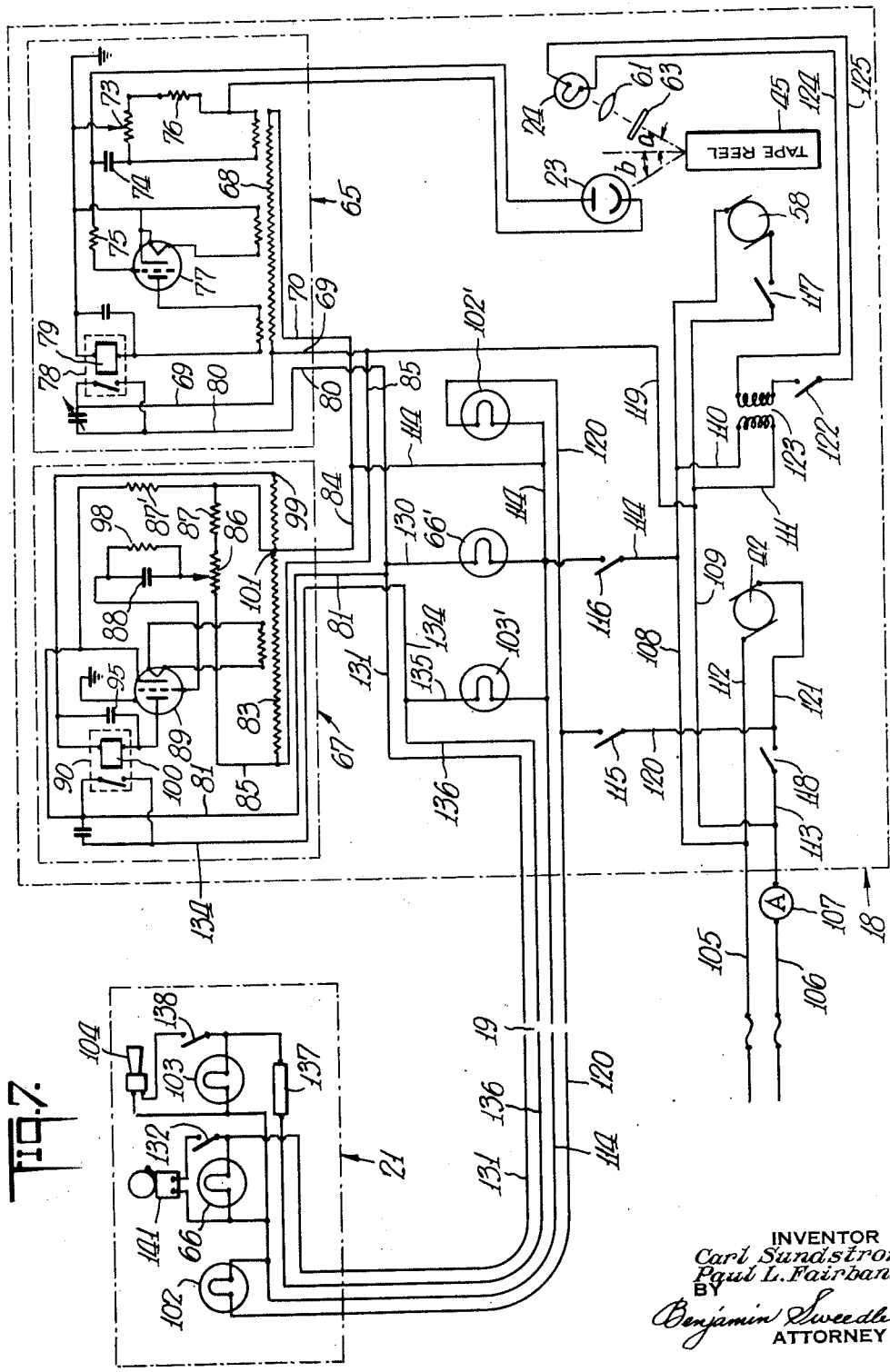

Patented May 19, 1953

2,639,418

UNITED STATES PATENT OFFICE 2,639,418

PHOTOSENSITIVE DETECTION APPARATUS

Carl Sundstrom and Paul L. Fairbanks, Syracuse, N. Y., assignors to Allied Chemical & Dye Corporation, New York, N. Y., a corporation of New York Application December 9, 1950, Serial No. 200,016

14 Claims. (Cl. 340—223)

This invention relates to the detection of a constituent in a medium into which such constituent may escape or in which it may occur. For example, this invention relates to the detection of noxious or toxic gases in the atmosphere or other medium. More particularly, this invention pertains to a detector for the prompt detection of the presence of chlorine, nitrosyl chloride or chlorine dioxide in air including the prompt detection of chlorine leaks from chlorine containers.

Chlorine is usually loaded in metallic cylinders or other containers which are delivered by motor trucks, railroad cars and ships to the point of consumption or storage in warehouses for reshipment to the point of consumption. Occasionally during shipment or storage one or more of the containers may develop a leak. Such leaks, if detected promptly, can readily be dealt with, since, while the concentration of the chlorine gas in air is below 4 parts per million, chlorine gas is not unduly harmful for the short period of time required to repair the leak or to dispose of the leaking tank or cylinder. If, however, the leak is not detected promptly the chlorine concentration builds up and a serious accident may result.

It is an object of this invention to provide a detector involving an alarm extension separated from the detector by a substantial distance and in which a signal system indicates whether the detector is operating properly.

It is another object of this invention to provide a detector for the detection of the presence of a noxious gas or other constituent in air or other medium, which detector is so designed that it indicates to the observer whether it is operating properly to detect the presence of the noxious gas or other constituent and also actuates an alarm, visual or audible, or both, promptly upon the entry of the noxious gas or other constituent into the air or other medium. Thus, in the case of equipment for detecting chlorine leaks, it is an object of this invention to provide equipment for promptly detecting such leaks, which equipment indicates to an observer located at a station or office remote from the storage zone whether the detector is operating properly to indicate a leak, should a leak develop. Upon the development of such leak the detector operates to actuate an alarm which notifies the observer at the remote station of the leak. One or more additional alarms suitably located, if desired, at or near the storage zone may be actuated also.

Still another object of this invention is to provide such detector which is unusually sensitive, i. e., will promptly detect the presence of chlorine in air in concentrations as low as 3 parts per million.

Still another object is to provide such detector which requires little servicing and which is relatively simple in construction, being made up principally of parts which are readily available and which are efficient in operation.

Still another object is to provide apparatus for detecting the presence of a noxious gas or other constituent in air or other medium, which apparatus involves the use of a relatively short sensitized test strip exposed to a beam of light, which strip remains sensitive for relatively long periods of time, say twenty-four hours and longer, even though repeatedly exposed to the beam of light.

Other objects and advantages of this invention will be apparent from the following detailed description thereof.

In accordance with this invention a detector is provided involving a moving relatively short test strip which changes color upon being subjected to a constituent, such as chlorine or other noxious gas, the presence of which it is desired to detect, in a gaseous medium such as air. This test strip in the preferred embodiment is placed in a housing into and through which is continuously passed a stream of the medium flowing in contact with the test strip. Each portion of the test strip is thus repeatedly passed through the focal area of the beam of light as the test strip is moved, preferably continuously. The speed of movement of the test strip is such that any given portion does not remain in the focal area of the beam of light projected thereon for a sufficient length of time to become desensitized. A photosensitive device is provided responsive to light received from the test strip, preferably light reflected therefrom. The intensity of the light passing from the test strip to the photosensitive device is reduced at regularly occurring intervals causing the photosensitive device to operate a signal, such as a signal light or bell or both, which signal is actuated periodically during the same intervals of time as the intensity of the beam of light from the test strip to the photoelectric cell is reduced. The periodic actuation of this signal notifies the observers that the detector is operating properly.

A time delay mechanism is actuated by the photosensitive device, this time delay mechanism in turn actuating a warning alarm. This time delay mechanism is operated when the test strip changes color due to the presence of the constituent which it is desired to detect in the medium passed into contact with the test strip. A change in color of the test strip causes a material reduction in the intensity of the light passing to the photoelectric cell for a period of time longer than the aforesaid regularly occurring interval and causes the time delay mechanism to actuate the warning alarm. In other words, the time delay mechanism prevents actuation of the warning alarm when the intensity of the light passing from the test strip to the photoelectric cell is reduced during the aforesaid regularly occurring intervals.

In the preferred embodiment of the invention illustrated on the drawings the invention is shown incorporated in a detector for detecting chlorine leaks and the present description will largely be confined to the present illustrated embodiment of the invention. It will be understood, however, that the novel features and improvements are susceptible to other applications, such, for example, as the detection of chlorine dioxide, nitrosyl chloride, nitric oxide, other strong oxidizing gases, hydrogen sulfide and other gases or constituents. The invention is also applicable to the detection of chlorine in the atmosphere, say in a room where chlorination reactions are carried out. Hence, the scope of this invention is not confined to the embodiment shown on the drawings and hereinafter described.

For the detection of chlorine the test strip desirably is an absorbent base, such as a fibrous base preferably white paper free from size, such as filter paper, impregnated with a solution of orthotolidine containing a hygroscopic substance and preferably also an acid, non-volatile under the conditions of use. Preferably a hygroscopic substance is used which is a solvent for orthotolidine, does not materially affect the property of orthotolidine to give a color reaction with chlorine and has a low vapor pressure at atmospheric pressure so that it does not evaporate from the test strip. Glycerin is preferred as the hygroscopic substance, but other hygroscopic substances, such as ethylene glycol, may be used. As the non-volatile acid any acid may be used which does not materially affect the property of orthotolidine to change color when contacted with chlorine and does not materially weaken the absorbent base. In general a non-volatile, weak, non-oxidizing acid, such as phosphoric, lactic, tartaric, citric and boric acid may be used. Orthophosphoric and boric acids are preferred; a mixture of orthorphosphoric and boric acids may be used, if desired. Test strips impregnated with orthotolidine, glycerin, and either orthophosphoric or boric acid or a mixture of orthophosphoric and boric acids are preferred for the detection of chlorine, chlorine dioxide, nitrosyl chloride, nitric oxide and other strong oxidizing gases, because of the unusual sensitivity of such test strips to such gases. Such test strips have been found to show a pronounced change in color from white to blue-green when contacted with an air stream containing as little as 3 parts per million of chlorine. When kept in tightly closed amber glass bottles, such test strips retain their sensitivity for relatively long periods of time, e. g., six months and longer.

For the detection of hydrogen sufide a test strip impregnated with an alkaline lead acetate may be used. For the detection of other constituents suitable test strips sensitive thereto should of course be used. As any suitable test strip may be used which shows an appreciable color change upon contact with the medium it is desired to detect, it is believed further description of such test strip is unnecessary.

In the accompany drawings forming a part of this specification and showing for purposes of exemplification a preferred form of this invention without however limiting the claimed invention to this illustrative instance, Figure 1 is a diagrammatic view showing a storage zone for chlorine containers, a detector near thereto and a station at a point remote from the storage zone in which station a warning alarm is disposed;

Figure 2 is a plan view of the detector mechanism;

Figure 3 is a side elevation partly in section of the portion of the detector mechanism in which the reel carrying the test strip is mounted;

Figure 4 is a vertical section through the reel carrying the test strip;

Figure 5 is a fragmentary vertical section, on an enlarged scale, taken in a plane passing through line 5—5 of Figure 3;

Figure 6 is a fragmentary plan of one form of test strip; and

Figure 7 is a wiring diagram of the detector and its associated alarm mechanism, including forms of photo-electric and time delay relays which may be employed, both being well known commercial forms.

Referring first to Figure 1 of the drawing, 11 indicates a storage zone which may be a warehouse, the hold of a ship, or other storage space in which are disposed chlorine containers 12. The air in storage zone 11 is circulated by means of a blower 13 communicating with a pipe 14 which has its inlet 15 disposed just above the base of the storage zone 11. Blower 13 draws in air through pipe 14 and discharges most of this air through a branch pipe 16, thus circulating the air in storage zone 11. A portion of the circulating air is withdrawn through a pipe 17 into detector housing 18, hereinafter described, by a blower located therein.

A cable 19 leads from detector housing 18 to a station 20, which may be the administrative office for the storage warehouse or the control room of a ship, etc., where an observer is stationed. Disposed in station 20 is an alarm casing 21 hereinafter more fully described. This alarm is constructed and designed to notify the observer whether the detector is operating properly and to promptly notify the observer when a chlorine leak takes place.

Referring to Figure 2, the detector housing 18 has disposed therein a phototube 23 and a source of light 24, such as a light bulb. Phototube 23 desirably is mounted on a standard 25 so that its position may be adjusted vertically and also so that it can be swiveled. Likewise, the light source 24 is suitably mounted on standards or brackets 26 which are designed to permit vertical adjustment of the light source and its rotation to direct the beam of light as may be desired. A short focal-length lens 61 (Figure 7) is placed in front of the light source to focus an intense spot of light at from 4″ to 6″ from the light source. A light filter 63 (Figure 7) of any well known type is disposed in front of the lens to provide a beam of monochromatic light, having a wave length of from 580 to 700 millimicrons, preferably from 620 to 660 millimicrons. This wave length of light has been found most efficient for use in a detector for detecting low concentrations of chlorine in air using a test strip impregnated with an orthotolidine solution because light of this wave length does not desensitize the test strip as rapidly as light of lower wave lengths and is not reflected by the green color of the chlorinated test strip with consequent improvement in the sensitivity of the photoelectric response.

The candlepower of the light source 24 will vary depending upon the spacing of the bulb relative to the test strip on which the beam of light is focused. With a 4" to 5" spacing between the light source and the focal spot a standard 32 candlepower bulb is satisfactory. If this spacing is increased a bulb of greater candlepower may be employed. The light source should be so chosen that it produces a strong enough beam of light capable of being reflected to the phototube by the test strip and yet will not cause premature desensitization of this test strip under the condition of use.

Disposed within the housing 18 is an air receiving chamber 27 which communicates through a pipe 28 with the pipe 17 into which is continuously introduced a portion of the air which is maintained in circulation in the storage zone 11. Pipe 28 is provided with an orifice plate 29; by utilizing an orifice plate having the desired size orifice the amount of air admitted to the chamber 27 may be controlled. Ports 31, 32 are disposed on opposite sides of the orifice in plate 29 for connecting a differential pressure gage thereto to provide a visual indication of the amount of air flowing through pipe 28 into chamber 27. We have found it is important to restrict the air flow through the chamber 27 to a maximum of about 2, preferably about .75 cubic feet per minute to prevent premature discoloration and desensitization of the orthotolidine test strip employed to detect chlorine leaks. With such flow of air it has been found that the sensitive test strip responds satisfactorily to low chlorine gas concentrations for as long as 40 hours and longer.

As will be seen from Figure 3 the air receiving chamber 27 involves an upper portion 33 communicating at one end with pipe 28 and provided with a base opening 34 through which the air flows into a body portion 35 of the chamber 27. Air exits from the body portion 35 through an opening 36 in a plate 37. The opposite corner portions 38, 39 of body portion 35 are blanked off to prevent accumulation of air in these corner portions and to insure the flow of the air stream into contact with both sides of the test strip as indicated by the arrows on Figure 3.

From the port 36 air flows through the lower portion 40 of chamber 27. Lower portion 40 is provided with a port 41 through which the air exits. A blower driven by motor 42 (Figure 7) communicates with port 41 and functions to cause the air to flow through pipe 28, upper portion 33, opening 34, body portion 35 as indicated by the arrows, opening 36, lower portion 40 and port 41. A cover plate 42' provided with a handle 43 closes the side of air chamber 27.

Rotatably mounted in body portion 35 of chamber 27 is a shaft 44 journalled in suitable bearings (not shown). Reel 45 is carried by this shaft. This reel has a foraminous periphery 46, which, for example, may be made of suitable wire gauze. A test strip 47 is suitably secured to this foraminous periphery. One form of such test strip is shown in Figure 6. It involves a relatively narrow, e. g., about ¾" wide strip of filter paper impregnated with an orthotolidine, glycerin, orthophosphoric and/or boric acid solution. This test strip has at regularly spaced intervals, e. g., about an inch apart, narrow dark color bands 48 the function of which will be hereinafter explained. These bands may be formed in any desired manner. For example, the strip may have these bands stamped or printed thereon with dark colored ink, e. g., black. These dark color bands may be of any desired width, about ¼" will be found satisfactory.

Test strip 47 may be secured to the foraminous periphery 46 of the reel 45 in any desired manner. One suitable construction for this purpose is shown in Figures 4 and 5. It involves a pair of pins 49 on a plate 50 secured to the reel 45. Pins 49 pass through the foraminous periphery 46 and project therefrom as shown in Figures 4 and 5. One end of the test strip 47 is secured to these pins, the strip then wound around the periphery of the reel, passed over the pins and secured thereto. The free end of the test strip is cut or torn off after the test strip has been securely fastened to the reel by cross bar 51 hereinafter described. A single thickness of test strip thus overlies the foraminous periphery 46 of the reel except in a narrow area where the pins 49 are located. In this narrow area two thicknesses of test strip are disposed. To maintain the test strip firmly in position on the periphery of reel 45, a clip is provided consisting of a cross bar 51 having one end pivoted as at 52 so that it can be moved in a horizontal plane out of contact with the test strip and the other end secured by a spring clip 53. Cross bar 51 is provided with openings 54, 55 for receiving the ends of pins 49. Spring clip 53 has one end suitably fastened as by screws 56 to one side of the reel and has the other end positioned to engage the cross bar 51 when it is moved to clamp the test strip to the periphery of the reel. With this construction an exhausted test strip can readily be removed and a fresh strip applied to the reel whenever desired by simply removing cover 42', removing the reel 45 from its shaft 44 and replacing the spent test strip with a fresh test strip and thereafter replacing the reel on its shaft and the cover 42' on its seat.

Reel 45 is rotated continuously by an electric motor 58 through suitable reduction gearing 59 which drives the shaft 44 on which the reel is mounted. Any suitable speed of rotation may be employed, e. g., a speed of rotation such that the circumference of the reel is moved about 3" per minute, has been found satisfactory.

Disposed in the front wall 60 of the air chamber 27 is a clear colorless plain glass window 64. This window is so positioned that it admits a beam of filtered light from the light source focused on focal area 62 of the test strip, which area occurs in the locality of the horizontal diameter portion of the reel on the side thereof contiguous to the window 64. With this construction the beam of light is focused on the test strip where the tangent to the reel 45 is at right angles to the beam. For convenience and in the interests of clarity the portion of the test strip continuously passing through this focal area will be referred to as the horizontal diameter portion thereof. The angle of incidence of the light beam projected on the test strip is indicated by $a$. Light thus falling on the test strip is reflected through the glass window 64 and is projected onto the phototube 23. The angle of reflection is indicated by the reference character $b$. We have found that for best results it is important the sum of the angles of incidence and reflection be within the range of from 40° to 50°, preferably from 40° to 42°.

In the embodiment of the invention shown on the drawing a 3″ diameter reel 45 is employed. 10″ lengths of sensitized test strips are applied to this reel and about ¼″ torn off after clamping the strip to the reel. A 32 candle-power light focuses a spot of light on the test strip; the focal spot is about 4″ from the light source. In operation it was found that rotation of the reel at a speed of one revolution in 3⅓ minutes, i. e., a circumferential speed of 2.9″ per minute did not result in desensitization of the test strip in 40 hours. In other words repeatedly short exposures of each portion of the test strip passing through the focal area of the beam of light did not have a cumulative effect on the sensitized test strip. Thus in the 40 hour operation example above noted the same spot of the test strip was exposed 720 times without becoming desensitized. This is indeed a surprising discovery particularly when due consideration is given to the fact that when a stationary test strip is subjected to a beam of light having a wave length of 620 to 640 millimicrons, the portion of the strip under the focal area became desensitized in 1 minute and would not change color when exposed to chlorine. Desensitization is even more rapid when the stationary test strip was exposed to a beam of light having a wave length of about 550 to 590 millimicrons.

Surprisingly by exposing each portion of the test strip repeatedly to the light for a short time interval, the test strip retains its sensitivity for relatively long periods of time, 24 hours and longer. Accordingly, as long as no leak develops, a test strip of about 10″ long need be used every 24 hours, it being desirable in the interests of caution to change the test strip at 24 hour or somewhat longer intervals. This compares with 200 to 300 linear feet of test strip required every 24 hours when employing a continuously moving test strip each portion of which is exposed to the light only once.

At regularly occuring intervals the intensity of the beam of light reflected from the test strip and received by the phototube 23 is reduced. In the embodiment of the invention shown on the drawings this is accomplished by the dark color bands 48 moving through the focal area 62 and thus causing little or none or the light projected on the test strip to be reflected to the phototube 23. Alternatively, a cage may be mounted on the reel having spaced transverse bars of dark color which when passing through the focal area 62 reduce the intensity of light reflected to the phototube.

Still another construction is to employ a rotating opaque strip rotated by motor 58 so as to pass through the beam of light at definite intervals and thus reduce the intensity of the light received by the phototube 23 at regularly occurring intervals. By the expression "reducing the intensity of the light" as used herein is meant either a complete interruption of the beam of light reflected on the phototube 23 or a reduction in the intensity thereof sufficient to cause the phototube to actuate the relay 65 in circuit therewith to energize signal lights 66, 66′.

In the embodiment of the invention shown on the drawings reel 45 may be rotated at a rate such that the time interval required for each dark color bar 48 to pass through the focal area 62 is from 4 to 5 seconds. On the other hand the time required for the portion of the test strip between successive dark color bars 48 to pass through the focal area 62 may be of approximately 23 to 25 seconds duration. Hence, at 23 to 25 second intervals for each 4 to 5 seconds during which the bars 48 pass through this focal area the intensity of the light reflected to the phototube 23 is materially reduced causing this phototube to energize relay 65 which in turn energizes signal lamps 66, 66′. These signal lamps accordingly flash for about 4 to 5 seconds at 23 to 25 second intervals indicating to the observer (1) the reel 45 is properly dressed with a sensitized test strip, (2) test strip is moving regularly, (3) the light source 24 is lighted and is projecting its beam of light onto the tape, (4) the phototube 23 and its relay assembly are operating properly, i. e., an alarm can be expected if chlorine contamination occurs. Accordingly, it should be apparent to an observer that if the lights 66, 66′ do not light up at regular intervals the detector is out of adjustment and requires attention, or one of its integrant parts may have failed.

Lamp 66 desirably is positioned in alarm casing 21 located at station 20. A similar lamp 66′ in the same circuit may also be positioned in casing 18 positioned in or near to the storage zone 11.

The photoelectric relay 65 may be any well known type responsive to changes in the intensity of the light received by phototube 23 and operative upon such changes to complete a circuit so as to cause one or more signal lights corresponding to lamps 66 and 66′ to be energized, and concurrently to energize a time delay mechanism 67.

One form of such photoelectric relay which may be used is General Electric Company's relay designated CR7505-K2, of which a simplified wiring diagram is shown as relay 65 at the upper right in Figure 7. This relay comprises a transformer 68 in a power input circuit containing A.-C. power lines 69, 70. Transformer 68 is in circuit with phototube 23. Positioned in this circuit is an adjustment potentiometer 73, condenser 74 and resistors 75, 76. An amplifying tube 77 is in circuit with phototube 23; this amplifying tube energizes relay 78 comprising a relay armature 79 and a power output line 80 connected with time delay relay 67 and the intermittent signal lights 66 and 66′ as hereinafter described. As the photoelectric relay may be of any well known type it is believed further description thereof is unnecessary.

The time delay mechanism may be of any desired type, such as a solenoid operated switch for closing a circuit, or other mechanism which closes the circuit after the lapse of a predetermined time interval. A preferred form of time delay relay is General Electric Company's relay designated CR7504-A1, of which a simplified wiring diagram is shown as relay 67 at the upper left in Figure 7. This relay comprises a transformer 83 in circuit with the power lines 84, 85. An adjustment potentiometer 86 is connected through resistors 87, 87′ and a condenser 88 with a vacuum tube 89, the grid circuit of which is controlled by the potentiometer 86. A relay 90 is in the plate circuit of the vacuum tube 89 and is provided with a capacitor 95.

In this construction, the setting of the potentiometer 86 will determine the charge on capacitor 88 which will regulate the time delay of the relay. The current for charging capacitor 88 flows from power line 85 through potentiometer 86 to its slider, through capacitor 88 from the grid to the cathode of the vacuum tube 89 and through resistor 87' to the power line 84.

When current from relay 65 flows through lines 80 and 81 to relay 67, capacitor 88 will start to discharge into resistor 98 and, after a time delay, relay 90 will pick up, as the current from relay 65 causes the cathode to be connected to power line 85, thus establishing a circuit from terminal 99 in the transformer 83 through the coil 100 of relay 90, from plate to cathode of vacuum tube 89 and then to terminal 101 of the transformer. The voltage applied to the grid of the tube 89 consists of two parts, the A.-C. voltage from terminal 101 to the slider of the potentiometer and the D.-C. voltage across capacitor 88. Since the D.-C. voltage in the grid circuit is greater than the A.-C. voltage in the grid circuit, the vacuum tube 89 does not pass current. However, the D.-C. voltage immediately commences to decrease when the current from relay 65 commences to flow to the time delay relay 67 because capacitor 88 discharges into resistor 98 and after a definite time the vacuum tube passes sufficient current to pick up the relay 90 thus closing the circuit comprising lines 81 and 134 and warning alarm 103'. The length of time delay can be adjusted by potentiometer 86. The output current from the time delay relay flows to the alarm mechanism as hereinafter more fully described.

When the flow of current from relay 65 to the time delay relay 67 through power lines 80 and 81 is interrupted, the capacitor 88 is recharged from power line 85. Thus the time delay relay is maintained in condition such that the tube 89 does not pass current unless current is supplied to the time delay relay 67 through lines 80 and 81 for an interval of time longer than that for which the time delay relay is set by the positioning of potentiometer 86.

In the embodiment of the invention above given involving flashing of the signal lamps 66 and 66' for about 4 to 5 seconds at 23 to 25 second intervals, potentiometer 86 is set to provide for a time delay of more than 5 seconds, say about 12 to 15 seconds. During the 4 to 5 second intervals capacitor 88 is discharging through resistor 98, these time intervals are not long enough to reduce the D.-C. voltage in the grid circuit to the point where the vacuum tube 89 will pass current. During the succeeding 23 to 25 second intervals capacitor 88 is recharged by current from power line 85.

Should the test strip change color, the intensity of the light reflected by the test strip is materially reduced for a period of time longer than that for which the time delay is set, e. g., longer than 12 to 15 seconds. Accordingly, capacitor 88 will continue to discharge into resistor 98 and after 12 to 15 seconds, the vacuum tube 89 will pass current causing the time delay relay to energize the alarm mechanism as hereinafter more fully described.

Alarm casing 21 desirably contains (1) a signal such as a signal light 102 (Figure 7) in circuit with the electric motor 42 for actuating the air blower and thus indicating whether the blower is operating properly; (2) light 66 which, as described above, flashes periodically and when so doing indicates the detector is operating properly; and (3) a warning alarm 103 which is actuated only by the time delay relay and which may be in the form of a flashing signal, such, for example, as a casing having the word "danger" or "chlorine" thereon and which has a light or lights therein which are intermittently or continuously energized. The warning signal may also comprise a buzzer or horn 104 which gives an audible alarm.

The remainder of Figure 7 indicates somewhat diagrammatically the electrical connections between the component parts of the detector embodying this invention. In this figure the relatively large rectangle represents the casing 18 of the detector. A.-C. power lines 105 and 106 lead into this housing and desirably are provided with a recording ammeter 107 which provides a permanent record of the variations of the power input to the detector. Since additional power over and above the normal power requirement of the reel motor 58 and the blower motor 42 of the detector are required to actuate the intermittently operating signal lights 66 and 66' and bell 141 as well as alarms 103 and 103' and buzzer 104, the recording ammeter will indicate if the detector has been operating properly and whether one or more alarms, due to the presence of chlorine in the air, have been given and, if so, when.

From the power line 105 a lead 108 leads to the reel motor 58, a lead 110 leads to the light source transformer 123, a lead 112 leads to the motor 42 for the air blower, and a lead 114, through switch 116, leads to the several signal lights 66, 66', 102, 102' and alarm lights 103, 103' and therefrom to photoelectric relay 65 through line 70 and to time delay relay 67 through line 84.

From the power line 106 a lead 109, through switch 117, leads to reel motor 58; a lead 111 goes to the light source transformer 123; a lead 113 connects with switch 118, from which lead 120 goes to the pilot lights 102, 102'; a lead 121 goes to blower motor 42; a lead 119 connects with photoelectric relay 65 through line 69, and with time delay relay 67 through line 85.

A switch 115 is inserted in lead 120. This switch which may be a so-called "microswitch" or a type of mercury switch is arranged to be operated by a diaphragm positioned in the lower compartment of the air chamber 27. This diaphragm closes the switch 115 to complete the circuit only when sufficient air is passing through chamber 27. With this construction, if cover 42' is improperly placed on its seat, or if the air inlet tube 28 is blocked, signal lights 102, 102' will not light up, even though the blower driven by motor 42 may be operating. Thus signal lights 102 and 102' indicate at the remote station 20 and at the detector, respectively, that the blower is operating properly and air in sufficient quantity is flowing through the air chamber 27. If the power is turned on and these lights are not energized, this notifies the observer immediately that either blower or associated air chamber 27 requires adjustment.

Low voltage power, of approximately 6 volts, is supplied to lamp 24 by means of line 125 from transformer 123 through switch 122. A return line 124 leads from lamp 24 direct to transformer 123.

Line 80 of relay 65 communicates with time delay relay 67 through line 81, through a branch 130 with signal light 66' on the exterior of the detector housing, and through another branch 131 provided with a switch 132 with signal light 66 in the remote alarm casing 21.

Line 134 of relay 67 leads to the visual and/or audible alarms 103 and 103', through branch 135 to the latter, desirably disposed on the outside of casing 18, and through 136 to alarms 103, 104, which are located in the remote alarm casing 21.

Remote alarm case 21 contains pilot light 102, energized from lines 120 and 114. Also the periodically flashing signal light 66 with its coactive audible signal 141, and the wavering alarm light 103 with its coactive audible alarm 104 which may be in the form of a well known buzzer. The wavering of the light and sound alarms 103 and 104 is brought about by inserting in line 136 a thermally operating alternately opening and closing circuit-switch 137. A switch 138 is desirably disposed in line 136.

Cable 19 (Figures 1 and 7) leading from detector 18 near storage zone 11 to alarm case 21 in remote station 20, it will be understood, contains the conductors 114, 120, 131 and 136.

In operation, reel motor 58 through reduction gearing 59 constantly rotates the reel 45 at the desired rate of speed, preferably about one revolution for every three minutes. A light beam from lamp 24 is continuously projected through lens 61 and light filter 63 on to the focal area 62 through which the test strip continuously passes. Normally when the test strip is white or light yellow to brown in color, except for the transverse bars 38, this light is reflected onto the phototube 28 as long as the lighter colored area of the sensitized test strip passes through this focal area. In the embodiment of the invention illustrated on the drawings this may be for from 23 to 25 seconds duration. While the dark color areas or bars 48 pass through the focal area 62, which may take from 4 to 5 seconds, the intensity of the light reflected to the phototube 23 is reduced. This causes the phototube 23, through the photoelectric relay 65, to energize lamps 66 and 66'. Thus, these lamps light for from 4 to 5 seconds at 23 to 25 second intervals notifying the observer in the warehouse and also at the remote station 20 that the detector is operating properly. As long as the blower driven by motor 42 is running and the current of air flowing through chamber 27 operates the mercury switch 115 to close the circuit containing the lights 102 and 102', it will be evident to the observer that this portion of the detector is also operating properly. Should the detector require adjustment this will be at once apparent to the operator, since in that event the signal lights 66, 66' will not flash periodically, or the pilot lamps 102, 102' will not be illuminated or both. The necessary adjustments can then be made to place the detector in satisfactory operating condition.

Should a chlorine leak develop from one or more of the cylinders 12, the chlorine will be rapidly dispersed in the air circulating about the cylinders. A portion of this circulating air stream is continuously withdrawn through pipe 17 by the blower driven by motor 42 and located within the housing of detector 18. This air flows through chamber 27 where it contacts the rotating test strip causing it to change color. This change in color will reduce the intensity of the reflected light received by the phototube 23. Since the presence of chlorine in the air will cause the entire test strip on circumference of reel 45 to change color, this reduction in the intensity will continue as long as the detector is operating and will cause the phototube to energize the photoelectric relay which in turn will energize the time delay relay actuating the alarms 103, 103' and buzzer 104. Steps can immediately be taken to repair the chlorine leak or dispose of the leaking tank or cylinder. Thereafter the detector may again be placed in operation by replacing the spent test strip with a fresh sensitized strip, as hereinabove described.

In operation it has been found that notwithstanding the continuous flow of a current of air over and through the test strip impregnated with an orthotolidine solution containing glycerin and orthophosphoric acid or boric acid, the test strip retains its sensitivity for a period of time of the order of 40 hours or longer. To maintain the apparatus so that it is sensitive to the presence of small amounts of chlorine in air of the order of 3 parts per million, it is therefore only necessary to replace the test strip, say at about 24 hour intervals. Of course, using a test strip which retains its sensitivity for a longer period of time, replacement of the test strip may be made less frequently.

It will be noted this invention provides a detector having a signal or alarm extension separated from the detector by a substantial distance and in which the signal system indicates whether the detector is operating properly. It is further noted the detector of this invention is extremely sensitive and will promptly detect the presence of chlorine in air in concentrations as low as 3 parts a million. As above pointed out, the detector requires little servicing. In normal operation it is necessary to replace the test strip with a fresh test strip not more than about once every 24 hours. This can readily be accomplished by simply removing the reel from the air flow chamber in which it is rotatably mounted, replacing the spent strip with a fresh one and thereafter replacing the reel. Moreover, the detector of this invention is relatively simple in design and efficient in operation, particularly since it is made up for the most part of parts, such as the photoelectric relay, the time delay relay, and light source, which are of standard construction and are readily available.

The term "signal" is used in the claims in a broad sense and includes visual and audible signals as well as signals which are both visual and audible.

It will be understood that the reference in the claims to the periodic reduction in the intensity of the light, including the reflected light, passing from the test strip to the photosensitive device is used in a broad sense and is intended to include the modification disclosed in this specification in which the light entering the photosensitive device is momentarily completely interrupted so that during such interruptions no light enters the photosensitive device.

Since certain changes may be made in the above detector and different embodiments of the invention could be made without departing from the scope thereof, it is intended that all matter contained in the above description or shown in the accompanying drawings shall be interpreted as illustrative and not in a limiting sense.

What is claimed is:

1. In a photosensitive detection apparatus, in combination, means for moving a test strip which changes color upon being subjected to a constituent the presence of which it is desired to detect in a gaseous medium, means for moving said gaseous medium into contact with said test strip, means for projecting a beam of light onto said test strip, a photosensitive device responsive to light received from said test strip, means for periodically reducing the intensity of the light passing from said test strip to said photosensitive device, a signal actuated by said photosensitive device responsive to said periodic reduction in the intensity of the light received by said photosensitive device, and a warning alarm actuated by said photosensitive device upon change in color of said test strip due to the presence of said constituent in said medium passing into contact with said test strip.

2. In a photosensitive detection apparatus, in combination, means for moving a test strip which changes color upon being subjected to a constituent the presence of which it is desired to detect in a gaseous medium, means for moving said medium into contact with said test strip, means for projecting a beam of light onto said test strip, a photosensitive device positioned to receive light reflected from said test strip, means for periodically reducing the intensity of the reflected light passing from said test strip to said photosensitive device, a signal periodically actuated by said photosensitive device responsive to said periodic reduction in the intensity of the reflected light received by said photosensitive device, said signal indicating whether the detector apparatus is operating properly, and a warning alarm actuated by said photosensitive device when the reflected light received thereby is reduced in intensity due to a change in color of said test strip.

3. In a photosensitive detection apparatus for detecting the presence of chlorine in air, in combination, means for moving a test strip which changes color upon contact with chlorine, means for flowing an air stream into which the chlorine may escape into contact with said test strip, means for projecting a beam of light onto said test strip, a photosensitive device responsive to light received from said test strip, means for periodically reducing the intensity of the light passing from said test strip to said photosensitive device, a signal actuated by said photosensitive device responsive to said periodic reduction in the intensity of the light received by said photosensitive device, and a warning alarm actuated by said photosensitive device upon change in color of said test strip.

4. In a photosensitive detection apparatus for promptly detecting chlorine leaks from chlorine containers disposed in a storage zone, means for continuously circulating the air in said storage zone, means disposed in the locality of said storage zone for continuously moving a test strip which changes color upon contact with chlorine, means for continuously withdrawing a portion of the circulated air from said storage zone and passing the same into contact with said test strip, means for continuously projecting a beam of light onto said test strip, a photosensitive device positioned to receive light reflected from said test strip, means for periodically reducing the intensity of the reflected light passing from said test strip to said photosensitive device, a signal periodically actuated by said photosensitive device responsive to said periodic reduction in the intensity of the reflected light passing from said test strip to said photosensitive device, and a warning alarm actuated by said photosensitive device when the reflected light received by said photosensitive device is reduced in intensity due to a change in color of said test strip.

5. In a photosensitive detection apparatus, in combination, a reel having a test strip on the periphery thereof, a motor for rotating said reel, means for projecting a beam of light on said test strip on said reel in the locality thereof near the horizontal diameter of said reel, a photosensitive device positioned to receive light reflected from said test strip, means for periodically reducing the intensity of the reflected light passing from said test strip to said photosensitive device, a signal periodically actuated by said photosensitive device responsive to said periodic reduction in the intensity of the reflected light received by said photosensitive device, said signal indicating whether the detector apparatus is operating properly, and a warning alarm actuated by said photosensitive device when the reflected light received by said photosensitive device is reduced in intensity.

6. In a photosensitive detection apparatus, in combination, means for moving a test strip, a light source positioned to project a beam of light on said test strip, a photosensitive device positioned to receive light from said test strip, a signal, means for periodically reducing the intensity of the light received by said photosensitive device and for simultaneously actuating said signal, a time delay mechanism actuated by said photosensitive device, and a warning alarm actuated by said time delay mechanism.

7. In a photosensitive detection apparatus, in combination, a reel for a test strip, a motor for rotating said reel, a light source positioned to project a beam of light on the locality of the horizontal diameter portion of the periphery of said reel, a photosensitive device positioned to receive light reflected from the test strip on said reel, a signal, means for periodically reducing the intensity of the reflected light received by said photosensitive device and for simultaneously actuating said signal, a time delay mechanism actuated by said photosensitive device, and a warning alarm actuated by said time delay mechanism.

8. In a photosensitive detection apparatus, in combination, a reel for a test strip, a motor for rotating said reel, a light source positioned to project a beam of light on said test strip, a photosensitive device positioned to receive light from said test strip, means for periodically reducing the intensity of the light received by said photosensitive device, a signal actuated by said photosensitive device responsive to said periodic reduction in the intensity of the light received by said photosensitive device, a time delay relay in circuit with said photosensitive device, and a warning alarm actuated by said time delay relay.

9. In a photosensitive detection apparatus, in combination, a housing, a reel having a foraminous periphery mounted in said housing, means on said reel for maintaining a test strip thereon, a blower for effecting the flow of a current of air into said housing into contact with the test strip on said reel, through said reel and out of said housing, an electric motor for rotating said reel, an electric light bulb for projecting a beam of light onto said test strip on said reel in the locality of the horizontal diameter portion thereof, a photoelectric cell positioned to receive light reflected from said test strip, said test strip having dark color bands thereon for reducing the intensity of the light reflected onto said photoelectric cell at regularly occurring intervals upon rotation of said reel, a relay energized by said photoelectric cell whenever the intensity of the reflected light received thereby is reduced by said dark color bands, a signal actuated by said relay, a time delay relay energized by said photoelectric cell through the first-mentioned relay, and a warning alarm actuated by said time delay relay.

10. In a photosensitive detection apparatus for promptly detecting chlorine leaks from chlorine containers disposed in a storage zone, in combination, means for continuously circulating the air in said storage zone, a housing in the locality of said storage zone, a reel having a foraminous periphery mounted in said housing and having a test strip on said periphery which changes color upon contact with chlorine, a blower for continuously withdrawing a portion of the circulated air from said storage zone and passing the same into contact with said test strip on said reel, through said reel and out of said housing, an electric motor for rotating said reel, an electric light bulb for projecting a beam of light onto said test strip carried by said reel in the locality of the horizontal diameter portion thereof, a photoelectric cell positioned to receive light reflected from said test strip, said test strip having dark color bands thereon at regularly spaced intervals for reducing the intensity of the light reflected from said test strip onto said photoelectric cell at regularly occurring intervals upon rotation of said reel, a relay energized by said photoelectric cell whenever the intensity of the reflected light received thereby is reduced by said dark color bands, a signal actuated by said relay, a time delay relay energized by said photoelectric cell, and a warning alarm actuated by said time delay relay.

11. In a photosensitive detection apparatus for promptly detecting chlorine leaks from chlorine containers disposed in a storage zone, in combination, means for continuously circulating the air in said storage zone, a detector housing in the locality of said storage zone, a reel having a foraminous periphery mounted in said housing and having a test strip on said periphery which changes color upon contact with chlorine, a blower for continuously withdrawing a portion of the circulated air from said storage zone and passing the same into contact with said test strip on said reel, through said reel and out of said housing, a signal actuated by the exiting air stream and indicating when activated that the air is passing properly through said housing, an electric motor for rotating said reel, an electric light bulb for projecting a beam of light onto said test strip carried by said reel in the locality of the horizontal diameter portion thereof, a photoelectric cell positioned to receive light reflected from said test strip, said test strip having dark color bands thereon at regularly spaced intervals for reducing the intensity of the light reflected from said test strip onto said photoelectric cell at regularly occurring intervals upon rotation of said reel, a relay energized by said photoelectric cell whenever the intensity of the reflected light received thereby is reduced by said dark color bands, a signal actuated by said relay and indicating when actuated at regularly occurring intervals that the detector is operating properly, a time delay relay energized by said photoelectric cell through the first-mentioned relay, and a warning alarm actuated by said time delay relay upon change in color of said test strip due to the presence of chlorine in the air stream passing through said housing in contact with said test strip.

12. A photosensitive chlorine detector apparatus as defined in claim 11, in which the detector is positioned in the locality of the storage zone, and the signal which indicates the detector is operating properly, the said warning alarm and the signal actuated by the exiting air stream are located at an observation station remote from said storage zone.

13. In a photosensitive detection apparatus for detecting the presence of a constituent in a gaseous medium, in combination, means for projecting a beam of light, means for moving a relatively short length of a sensitized test strip which changes color upon exposure to said constituent through said beam of light so that only a small portion thereof is exposed at one time to said beam of light and said small portion remains so exposed for a period of time insufficient to prematurely desensitize said small portion of said test strip due to prolonged exposure to said beam of light, said moving means also moving said relatively short length of the sensitized strip so that such successive small portions thereof are repeatedly exposed to said beam of light for substantially the same period of time at regularly occurring time intervals while the remainder of the test strip is not so exposed, means for contacting said test strip with a stream of said gaseous medium, and means for energizing a signal responsive to said change in color of said test strip.

14. In a photosensitive detection apparatus for detecting the presence of a constituent in a gaseous medium, in combination, means for projecting a beam of light, means for moving a relatively short endless sensitized test strip which changes color upon exposure to said constituent through said beam of light so that only a small portion thereof is exposed to said beam of light at one time and said portion remains so exposed for a period of time insufficient to permaturely desensitize said small portion due to prolonged exposure to said beam of light, said moving means also moving said relatively short endless sensitized test strip at a rate to repeatedly expose to said beam of light for substantially the same period of time such successive small portions thereof at regularly occurring relatively frequent time intervals, means for contacting said test strip with a stream of said gaseous medium, and means for energizing a signal responsive to said change in color of said test strip.

CARL SUNDSTROM.
PAUL L. FAIRBANKS.

References Cited in the file of this patent

UNITED STATES PATENTS

| Number | Name | Date |
|---|---|---|
| 892,241 | Freise | June 30, 1908 |
| 1,711,742 | Nordlander | May 7, 1929 |
| 2,232,622 | Moses et al. | Feb. 18, 1941 |
| 2,552,107 | Miller et al. | May 8, 1951 |